United States Patent

[11] 3,634,705

[72] Inventor Frank P. Fidei
  Pittsburgh, Pa.
[21] Appl. No. 31,296
[22] Filed Apr. 23, 1970
[45] Patented Jan. 11, 1972
[73] Assignee Westinghouse Electric Corporation
  Pittsburgh, Pa.

[54] COOLING SYSTEM FOR DYNAMOELECTRIC MACHINES
4 Claims, 5 Drawing Figs.

[52] U.S. Cl. .................................................. 310/57, 310/65
[51] Int. Cl. ..................................................... H01v 9/19
[50] Field of Search ........................................... 310/52, 54, 55, 57, 64, 65, 58

[56] References Cited
UNITED STATES PATENTS
3,112,415 11/1963 Bahn et al. ..................... 310/54
3,459,979 8/1969 Dickinson ..................... 310/269 X
3,271,600 9/1966 Philofsky ...................... 310/55
3,185,872 5/1965 Weissheimen ................. 310/64 X
2,695,368 11/1954 Kilbouone ..................... 310/64

FOREIGN PATENTS
1,280,393 10/1968 Germany ...................... 310/64

Primary Examiner—J. D. Miller
Assistant Examiner—B. A. Reynolds
Attorneys—A. T. Stratton and F. P. Lyle ABSTRACT: A connecting means for use in the cooling systems of large turbine generators in which coolant is circulated through the coils of the stator winding in a closed system. A common hydraulic and electrical connector is provided for each end of each winding conductor, or half-coil, which makes connection between the conductor and the coolant supply system and also provides for electrical connection to the conductor.

COOLING SYSTEM FOR DYNAMOELECTRIC MACHINES

BACKGROUND OF THE INVENTION

The present invention relates to cooling systems for dynamoelectric machines, and more particularly to connection means for connecting the stator winding conductors of large turbine generators to the coolant supply system and for making the electrical connections to the conductors.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size.

These machines have usually been cooled by a coolant gas, hydrogen being commonly used, which fills the gastight housing and is circulated by a blower on the rotor shaft through the ducts of the stator and rotor windings and through radial ducts in the stator core. As the ratings of these large generators have increased, however, it has become necessary to further improve the cooling of the stator windings, and for this purpose it has been proposed to use more efficient coolant fluids in the ducts of the stator winding. Such coolants may for example be a liquid such as water, or a gas at high pressure such as hydrogen at a pressure of several hundred pounds per square inch. The use of such coolant fluids requires that the coolant be circulated through the stator coils in a closed recirculating system separate and sealed from the coolant gas in the housing which cools the stator core and the rotor winding.

When a liquid coolant such as water is used, some or all of the individual strands of which the winding conductors are composed are preferably made hollow for circulation of coolant ducts. When this is done, the conductor strands which are part of the electrical circuit of the machine also form part of the hydraulic circuit of the cooling system, and must be connected in both the electrical circuit and the hydraulic circuit. The problem then is to make both the necessary electrical connections between adjacent winding conductors, and also the necessary hydraulic connections in a manner which provides reliable, fluidtight connections and which can readily be manufactured without undue complication. It has been proposed to separate the electrical connections from the hydraulic connections, as in Tudge U.S. Pat. No. 3,030,530, and it has also been proposed to combine the electrical and hydraulic connections in a common connector means as in Kilbourne U.S. Pat. No. 2,695,368 and Philofsky U.S. Pat. No. 3,497,737. None of these previously proposed solutions to the problem has been entirely satisfactory however, because of the manufacturing difficulties and other complications involved in their use.

SUMMARY OF THE INVENTION

The present invention provides a connecting means for each end of a winding conductor which makes both hydraulic and electrical connections to the conductor. The winding conductors, or half-coils, of turbine generators are subdivided into strands and in liquid-cooled machines some or all of these strands are made hollow to serve as coolant ducts. This means that the connector must accommodate a large number of both solid and hollow strands which must be joined together and to the connector in a manner to provide a fluidtight seal between the strands and the connector, and also between stacks of strands and between the individual strands to prevent leakage of coolant liquid. An electrical connection capable of carrying the heavy load currents which flow in the winding conductor must also be made between the conductor strands and the connector means.

In accordance with the present invention, a connector means is provided which encloses the ends of the strands of a winding conductor and provides connection to the cooling system for supplying a coolant fluid. Means are provided for making brazed connections between the strands and the connector, between the stacks of strands, and between individual strands in such a manner that the strands are secured in the connector by brazed joints which form a reliable fluidtight seal so that coolant flowing into the connector flows into and through the hollow strands without any risk of leakage between the strands and the connector or between strands. Since such brazed joints also provide good electrical connections, the connector itself can be used to make the electrical connection to the conductor.

The problem of making the desired brazed joints between the strands and the connector and between strands has been a difficult one. It has been considered necessary heretofore to preplace the brazing alloy between individual strands and between other surfaces to be joined. Various arrangements have been tried for this purpose without satisfactory results, and the practice of preplacing brazing alloy between strands has been impractical in actual manufacture because of the large number of strands in each of the many winding conductors in a machine. In accordance with the present invention, this problem has been overcome by preplacing the brazing alloy in grooves on the inner surface of a connector and in grooves in spacers between adjacent stacks of conductor strands. It has been found that when this is properly done and the assembly heated the brazing alloy flows by capillary action into the desired places and a reliable fluidtight joint is obtained. The invention therefore provides a reliable hydraulic and electrical connector for the cooling systems of large turbine generators which can readily be manufactured without undue complication.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
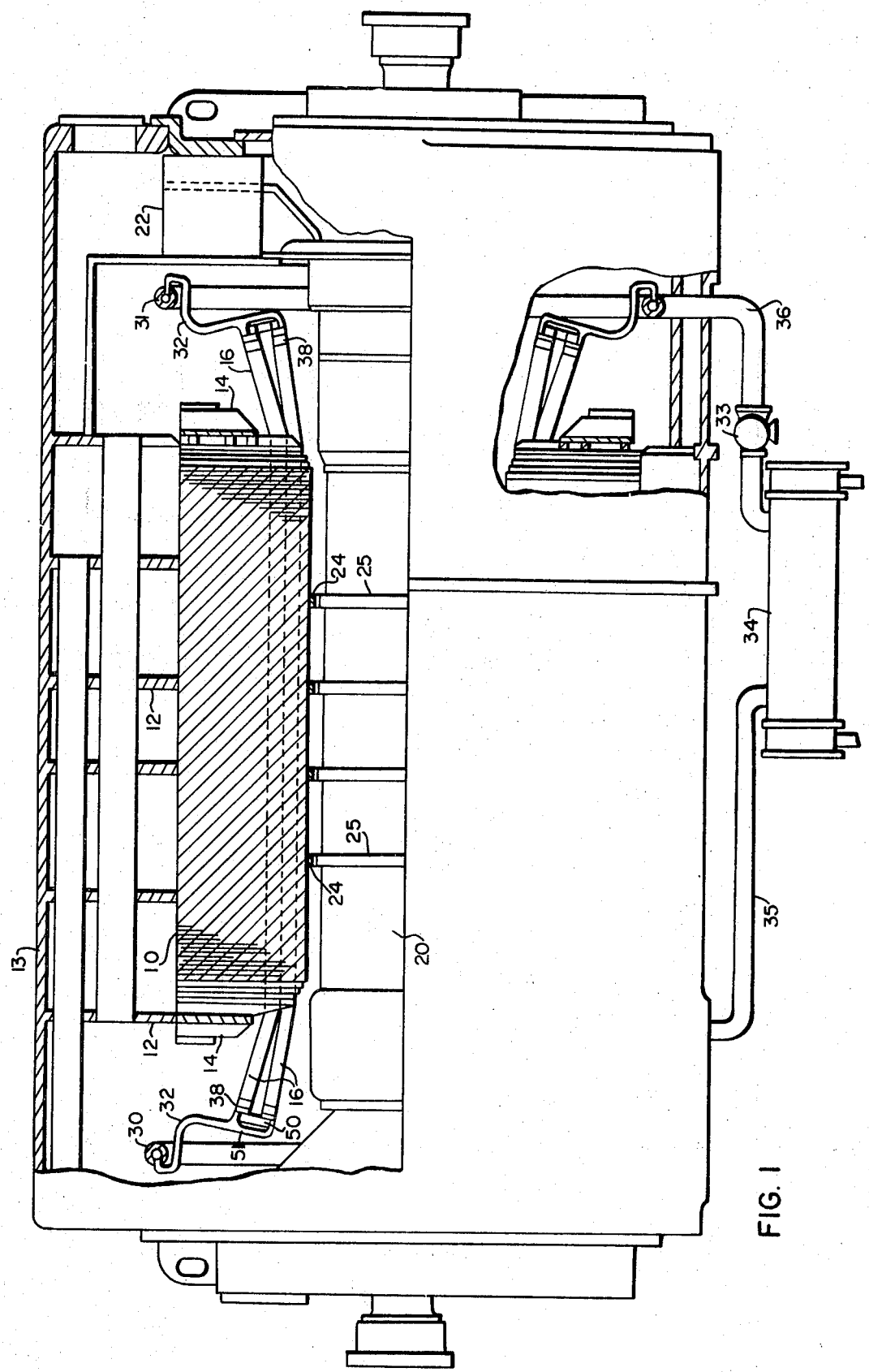
FIG. 1 is a view partly in longitudinal section and partly in elevation of a turbine generator having a cooling system embodying the invention.

Referring particularly to FIG. 1 of the drawings, the generator construction shown for the purpose of illustration is generally similar to that shown in a patent to R. A. Baudry U.S. Pat. No. 3,110,827. However, it will be understood that the present invention may be utilized with any dynamoelectric machine having a closed cooling system for the stator coils of the machine.

As shown, the generator has a stator core 10 supported by frame rings 12 in a substantially gastight outer housing 13. The stator core 10 is of the usual laminated type having a generally cylindrical bore therethrough. The core 10 is preferably built up of laminations arranged in spaced stacks to provide radial vent ducts between them, and the laminations of the core are clamped between suitable end plates 14 in the usual manner. The stator core 10 has longitudinal slots in its inner periphery for the reception of a stator winding which may be of any suitable type, and which preferably consists of a plurality of winding conductors 16 which constitute half-coils connected at their ends to form a complete stator winding.

Figure 4:
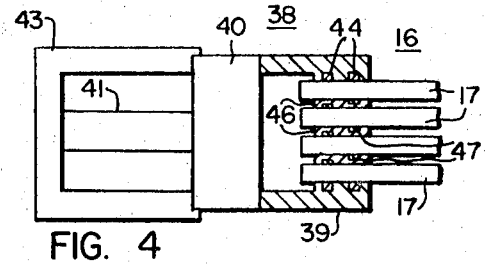
FIG. 4 is a plan view, partly in section, of an end of a winding conductor with the connecting means in place thereon.
Figure 5:
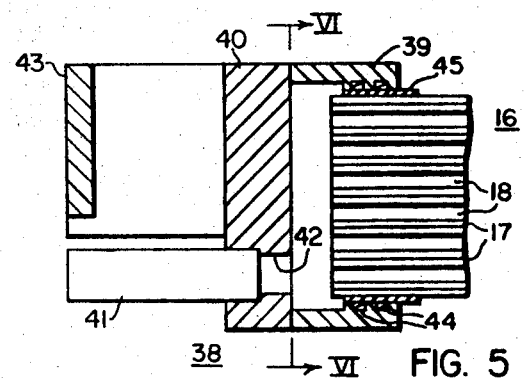
FIG. 5 is a longitudinal sectional view of the end of a conductor with the connecting means in place, the view being taken substantially on the line V—V of FIG. 6.
Figure 6:
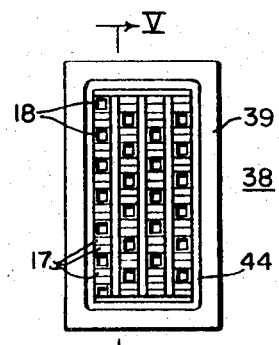
FIG. 6 is a transverse sectional view substantially on the line VI—VI of FIG. 5.

The stator winding is of the inner-cooled construction and, as shown in FIGS. 4, 5 and 6, each winding conductor or half-coil 16 comprises a plurality of strands 17. In the particular embodiment shown the strands of each conductor are disposed in four stacks although other suitable arrangements or numbers of stacks of strands might be used. The strands 17 are insulated from each other and are transposed in any suitable manner. Since the strands of each conductor are shorted together at each end by the connector means, as described hereinafter, a type of transposition should be utilized which makes it possible to connect the strands together at the ends without incurring excessive losses. In order to provide for circulation of a liquid coolant through the winding conductors, some or all of the conductor strands 17 are made hollow to serve as coolant ducts. In the particular embodiment illustrated, as shown in FIG. 6, every third strand 18 in each of the four stacks is hollow, the remaining strands being solid. It will be understood that if necessary or desired, all of the strands might be made hollow or hollow and solid strands may be mixed in any desired proportion and in any desired arrangement. Each winding conductor 16 is of course enclosed in the usual heavy ground insulation, which has not been illustrated in the drawing, and which is removed from the extreme ends of each conductor to permit application of the connecting means. In accordance with the usual practice two winding conductors are placed in each slot of the stator core, and the end portions of each conductor beyond the slot are formed in the usual manner to extend around the core for connection to the end of another winding conductor lying in a different slot to form a complete coil.

A rotor 20 is disposed in the bore of the stator core 10 and separated from the stator by an annular airgap. The rotor 20 is supported in bearings of any suitable type mounted in the ends of the housing 13, and the bearing assemblies preferably include gland seals to prevent leakage of gas along the rotor shaft. The bearings and gland seals may be of any suitable or usual construction and have not been illustrated as they are not part of the invention. The rotor 20 is provided with a field winding of usual type and the rotor and field winding may be of any usual or suitable construction.

The housing 13 of the machine is made as nearly gastight as possible, and is filled with a suitable coolant gas, preferably hydrogen, which is used in the illustrated embodiment for cooling the rotor and the stator core. A blower may be mounted on the rotor shaft for circulating the gas within the housing and suitable baffles and ducts may be provided in the housing to control and direct the flow of gas therein. The gas in the machine is maintained at a suitable static pressure which may for example be from 30 to 75 pounds per square inch above atmospheric pressure, although other gas pressures might be used depending on the desired rating of the machine. The gas is circulated within the housing and through coolers 22 built into the housing to remove heat from the stator core and from the rotor and rotor winding. Any desired type of circulation may be used, and in the particular machine shown the airgap is divided transversely into a plurality of annular zones by means of stationary annular baffles 24 on the stator core and baffles 25 on the rotor. Adjacent zones of the airgap are maintained at different gas pressures to cause the gas to flow from high-pressure zones to adjacent low-pressure zones through ducts in the rotor winding. This method of cooling the rotor, and the means by which the desired gas flow is obtained are fully described in the above-mentioned Baudry patent, to which reference is made for a more complete description. The means for cooling the rotor and stator core will not be further described herein since they are not a part of the present invention, and the stator winding cooling system herein disclosed may be used in any machine having any desired type of cooling for the rotor.

In accordance with the present invention, the stator winding is cooled by a closed recirculating system for circulating coolant fluid through the hollow conductors of the stator winding. Such a cooling system may include an intake manifold 30 at one end of the stator core 10 and a discharge manifold 31 at the opposite end. These manifolds may consist of annular tubes or pipes extending circumferentially around the core and mounted in the housing in any suitable manner. The manifolds 30 and 31 are connected by means of a plurality of insulating pipes or tubes 32 to the ends of the individual winding conductors as more fully described hereinafter.

The coolant fluid for the stator winding is preferably a suitable liquid such as water and is circulated through the winding by means of an external pump 33. The pump circulates the coolant liquid discharged from the machine through a cooler 34 of any suitable type and through an entrance pipe 35 which passes through the housing 13 and is connected to the intake manifold 30. The coolant liquid discharged at the other end of the machine flows to the discharge manifold 31 and to a discharge pipe 36 which passes through the housing 13 to the pump 33. In this way a closed recirculating system is provided which is entirely separate from the cooling system for the rotor and the stator core, so that more effective cooling of the stator winding can be obtained. It will be understood that any suitable type of recirculating means may be utilized, and that the system may include other necessary or desirable elements such as filters and water treatment equipment.

Each end of each winding conductor 16 is connected to the coolant system by connector means 38 which also effects electrical connection to the conductor. As shown particularly in FIGS. 4, 5 and 6, each connector 38 constitutes a header member which encloses the end of the conductor 16 and extends beyond the ends of the strands 17. More particularly, each header 38 includes a rectangular copper sleeve member 39 which surrounds the end of the conductor and extends beyond it as shown to provide an enclosed space beyond the end of the conductor. This space is closed by a closure member 40 which is preferably a copper closure plate brazed to the sleeve member 39 to form a fluidtight joint. A completely enclosed space is thus provided at the end of the conductor through which coolant fluid may flow into or out of the hollow strands of the conductor. A conduit means 41 is provided for conveying fluid to or from the enclosed space within the header 38. The conduit means 41 may be a suitable length of copper or stainless steel tubing brazed in an opening 42 in the plate 40 with a fluidtight joint. The connector or header 38 also includes terminal means for effecting electrical connection to the conductor 16 and, in the illustrated embodiment, the terminal means comprises a U-shaped member 43 made of copper strap and brazed to the outside of the closure plate 40 above the conduit 41.

As previously discussed, it is necessary to secure the connectors 38 to the ends of the winding conductors 16 with fluidtight connections. This means that there must be fluidtight joints not only between the connector itself and the strands which it immediately adjoins but also between the stacks of strands and between the individual strands in each stack. This is necessary to prevent any leakage of fluid from the connector between the stacks of strands or between adjacent individual strands. The present invention provides a construction which makes it possible to make reliable brazed joints between the connector and the strands, between stacks of strands and between strands in a reliable and relatively simple manner to effect the desired fluidtight connections between the conductor 16 and the coolant system.

The sleeve member 39 of the connector 38 has a plurality of internal grooves 44 extending around its entire inner periphery as shown in FIGS. 4, 5 and 6. These grooves are filled with a suitable brazing alloy prior to assembly of the connector on the conductor, and the sleeve 39 is placed over the conductor 16 as shown in the drawing so that its internal surfaces are in contact with the adjacent columns of strands at each side and support the brazing alloy in contact with the strands. At the top and bottom, as shown in FIG. 5, copper or other conducting shims 45 may be placed within the sleeve at the top and bottom of the conductor if necessary to maintain a tight assembly. In addition, spacers 46 are placed between adjacent stacks of strands as shown in FIG. 4 to separate them slightly at the end of the conductor and to maintain the desired overall dimension for assembly in the sleeve 38. The spacers 46, as clearly shown in FIG. 4, have grooves 47 on opposite sides which are filled with brazing alloy prior to assembly.

In assembling the device, the brazing alloy is placed in the grooves of the sleeve member 39 and the spacers 46 prior to assembly. The spacers are then put into place between the stacks of strands and the sleeve 39 is put into position over the outside of the end of the conductor as shown in the drawings. Shims 45 may be used if necessary to obtain a tight assembly. The entire assembly is then heated to brazing temperature, as by induction heating, while tightly held in position preferably under pressure, and the brazing alloy melts and moves by capillary action between the adjacent surfaces, that is, between the adjoining surfaces of the sleeve member and the stacks of strands, between the stacks of strands and the adjacent spacers, and between the individual strands in each stack. It has been found that if the connector is assembled with reasonably good dimensional control, the brazing alloy will behave in the desired manner and a good reliable fluidtight connection between the connector 38 and the conductor 16 is obtained. The spacers 46 facilitate maintenance of the desired dimensional accuracy in assembly as they accurately space and locate the ends of the strands in the connector. The spacers also serve to place the brazing alloy in the desired positions, and the spacers as well as the shims 45, if used, function to conduct heat during the brazing operation to insure uniform temperature throughout the assembly and completely reliable joints are thus obtained in all the necessary places.

It will be apparent that the connectors 38 may be applied to the ends of the winding conductors 16 either before or after the winding conductors are placed in the slots of the stator core 10. In either case after the conductors are in place with the connectors attached to both ends of each conductor, the electrical and hydraulic connections are made as shown in FIGS. 2 and 3.

Figure 2:
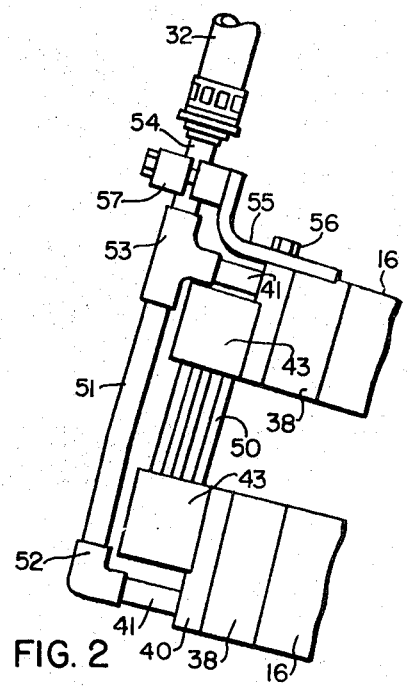
FIG. 2 is a view in elevation showing the electrical and hydraulic connections of two adjacent winding conductors, only the end portions of the conductors being shown.
Figure 3:
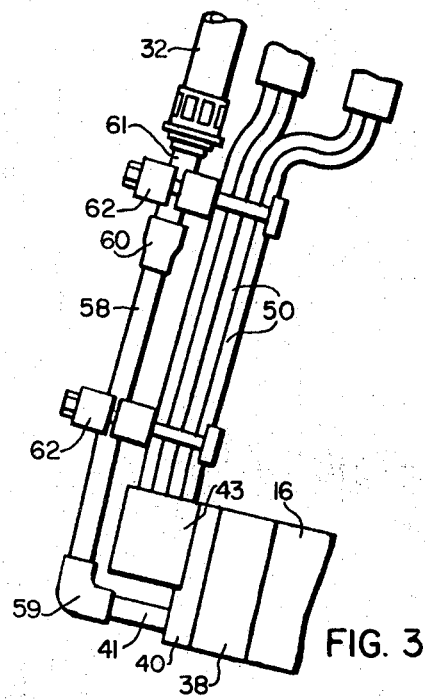
FIG. 3 is a view similar to FIG. 2 showing the electrical and hydraulic connections to a single winding conductor.

In most instances the end of each conductor 16 lies adjacent the end of another conductor located in a different slot, somewhat as shown in FIG. 2, and the two conductors are connected together to form a complete coil by means of a plurality of flexible copper conductors 50 which are inserted in the terminal members 43 of each of the connectors 38 and brazed therein. The conductors 50 thus effect electrical connections between the adjacent winding conductors. Because of the solid brazed connections between all parts of the stranded conductor 16 and the connector 38, and between the terminal member 43 and the conductors 50, a good electrical connection is made which is capable of carrying the very high load currents which occur in the large generators for which the invention is particularly intended.

The conductors 16 are connected to the coolant supply system by means of a conduit 51 which may be a suitable length of copper or stainless steel tubing connected to the conduit 41 of the lower connector 38 by means of an elbow 52 and to the conduit 41 of the upper connector 38 by means of a T fitting 53. The T-fitting 53 in turn is connected by a suitable length of tubing 54 to the insulating tube 32 which connects to one of the manifolds 30 or 31 and thus connects the conductors to the coolant supply system. The flexible conductors 50 provide a certain amount of flexibility between the adjacent ends of the two conductors 16 to permit some relative movement such as may be caused by differences in thermal expansion. The relatively rigid tubing 51 and the associated fittings, however tend to support the conductors in a mechanically stable structure. Additional support may be provided by a bracket 55 which is attached to the upper connector 38 by means of a screw 56 threaded into the closure plate 40. A clamp 57 encircles the tube 54 and is secured to the bracket 55 to support the entire assembly from the upper connector 38 and thus insure adequate rigidity.

At some points in the winding, such as at the ends of a phase belt, an individual winding conductor 16 is connected directly to a terminal or to a connection ring rather than to another winding conductor. Connections to such individual conductors 16 are made in the manner shown in FIG. 3. As there shown, the flexible copper conductors 50 are brazed into the terminal member 43 in the same manner as before but are made of greater length as required to permit the desired connection to be made. They hydraulic connection is similarly made by a length of copper or stainless steel tubing 58 connected to the conduit 41 by an elbow 59 and connected at its upper end to the insulating tube 32 by a suitable coupling 60 and tubing 61. Mechanical stability is insured by two or more clamps 62 of any suitable type which are clamped around the tubing 58 and the conductors 50 to clamp the entire assembly together to provide the desired degree of rigidity and support for the conductors.

It will now be apparent that improved connecting means have been provided for effecting both electrical and hydraulic connections to the winding conductors of a stator winding. The construction of the connector is such that a reliable brazed joint is readily produced to join the conductor to the connector with a fluidtight joint which prevents any leakage either between the conductor and the connector or between the individual strands of the conductor. This is an important feature, especially where a liquid such as water is used as a coolant, and leakage is extremely undesirable. The disclosed construction makes it possible to provide reliable joints in a relatively simple manner so that they can easily be manufactured and a reliable and substantially leakproof coolant system is thus provided for the machine. It will also be apparent that although a particular type of generator construction and a particular type of coolant system have been shown, the invention is applicable generally to any type of dynamoelectric machine nd to any type of closed coolant system. While a particular embodiment of the invention has thus been disclosed for the purpose of illustration, it is to be understood that the invention is not so limited and includes all equivalent embodiments and modifications.

I claim as my invention:

1. In a dynamoelectric machine having an annular stator core with longitudinal slots therein, winding conductors disposed in said slots, each of said conductors comprising a plurality of strands, each of said conductors comprising a plurality of strands, at least some of said strands being hollow for circulation of a coolant fluid therethrough, a coolant supply system for supplying coolant fluid, connector means at each end of each conductor, each of said connector means enclosing the end of the conductor and being joined thereto with fluidtight, electrically conductive joints, the connector means having conduit means extending therefrom for flow of said coolant fluid, the connector means also having terminal means for making electrical connection thereto, the winding conductors being arranged in said slots such tat each conductor has at least one end disposed adjacent one end of another conductor for connection thereto, the connector means of each such pair of adjacent conductor ends being connected together by flexible electrical conductors secured in said terminal means, a conduit pipe connected to the conduit means of both connector means of each such pair of adjacent conductor ends, an insulating tube member connecting each said conduit pipe to said coolant supply system, and substantially rigid support means for supporting said conduit pipes from said conductor ends.

2. The combination defined in claim 1 in which said support means comprises a bracket member secured to the connector means of one of each such pair of adjacent conductor ends and means for clamping the associated conduit pipe to each of said bracket members.

3. In a dynamoelectric machine having an annular stator core with longitudinal slots therein, winding conductors disposed in said slots, each of said conductors comprising a plurality of strands, at least some of said strands being hollow for circulation of a coolant fluid therethrough, a coolant supply system for supplying coolant fluid, connector means at each end of each of said conductors, each of said connector means comprising a conducting header member enclosing the end of the conductor, said strands being disposed in a plurality of columns, conducting spacers disposed between adjacent columns of strands with the header member, the strands being joined to the header member and to each other with fluidtight, electrically conductive brazed joints between the spacers and the adjacent columns of strands, between the columns of strands and the header member, and between adjacent strands, the surfaces of the header member and of the spacers in contact with the strands having grooves therein for receiving a brazing alloy to make said joints, means for connecting the header member to said coolant supply system, and means on the header member for making electrical connection thereto.

4. In a dynamoelectric machine having an annular stator core with longitudinal clots therein, winding conductors disposed in said slots, each of said conductors comprising a plurality of strands, at least some of said strands being hollow for circulation of a coolant fluid therethrough, a coolant supply system for supplying coolant fluid, connector means at each end of each of said conductors, each of said connector means comprising a conducting header member enclosing the end of the conductor, said strands being disposed in a plurality of columns, the header member comprising a sleeve member surrounding the strands and extending beyond the ends thereof and a closure member closing the end of the sleeve member, conducting spacers disposed between adjacent columns of strands within said sleeve member, the interior surfaces of the sleeve member and the surfaces of the spacers having grooves therein for receiving a brazing alloy to make fluidtight, electrically conductive joint between the spacer and the adjacent columns of strand, between the columns of strands and the sleeve member, and between adjacent strands, conduit means extending through said closure member for connection to the coolant supply system, and terminal means on the closure member for making electrical connection to the header member.

* * * * *